April 18, 1933.  H. W. MELLING  1,904,949
LATHE
Filed Sept. 13, 1930   3 Sheets-Sheet 1

INVENTOR
Herman W. Melling
BY
Chappell & Earl
ATTORNEYS

April 18, 1933.   H. W. MELLING   1,904,949
LATHE
Filed Sept. 13, 1930   3 Sheets-Sheet 2
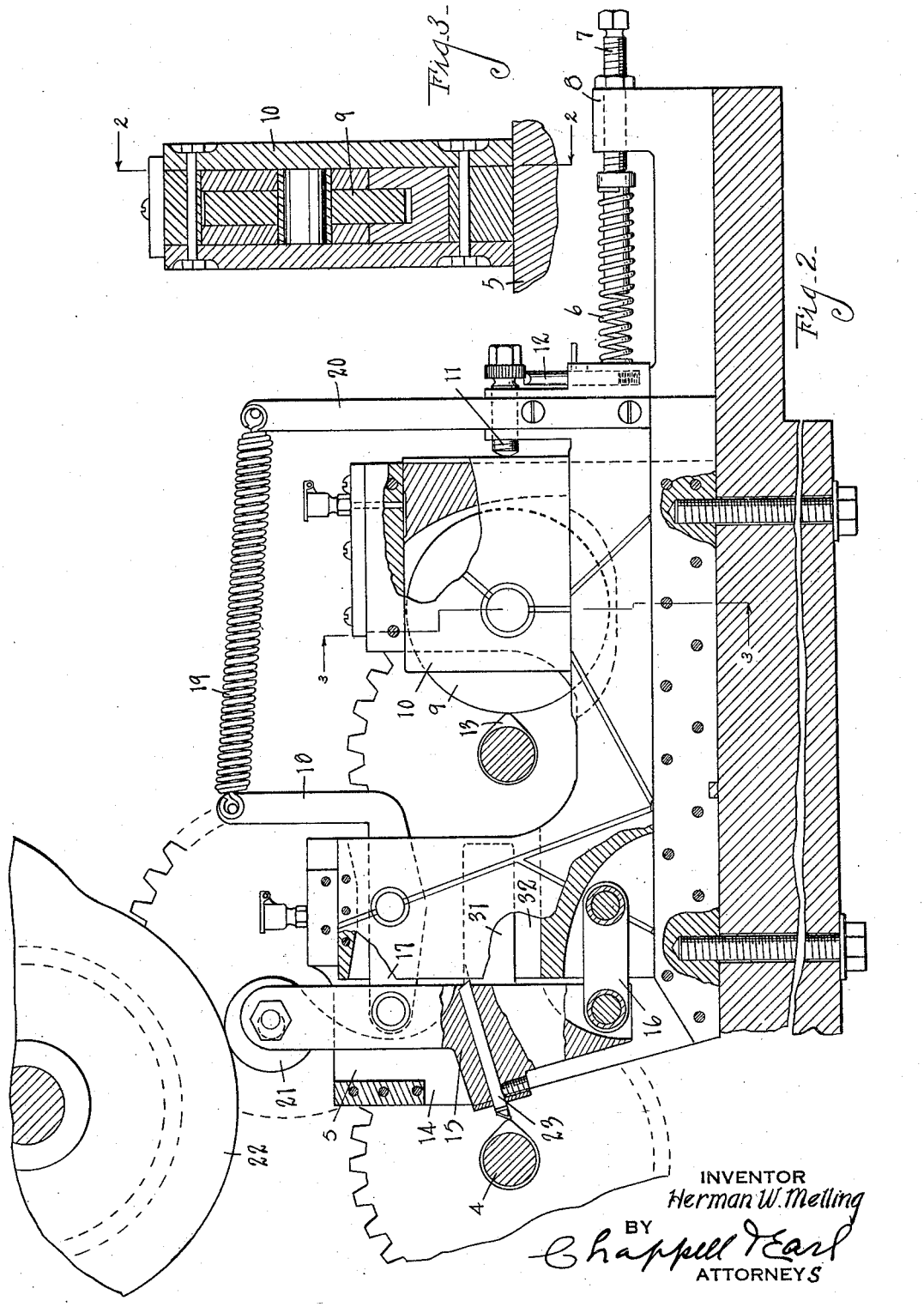

April 18, 1933.   H. W. MELLING   1,904,949
LATHE
Filed Sept. 13, 1930   3 Sheets-Sheet 3
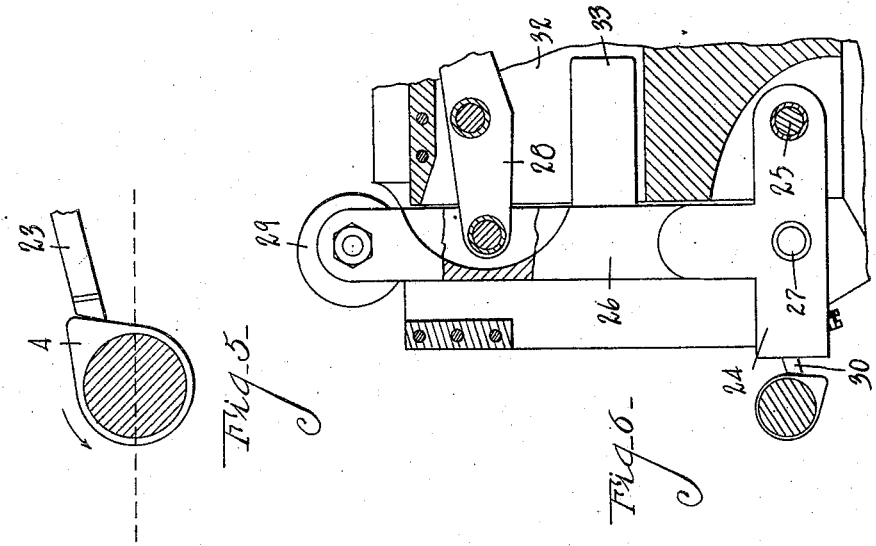
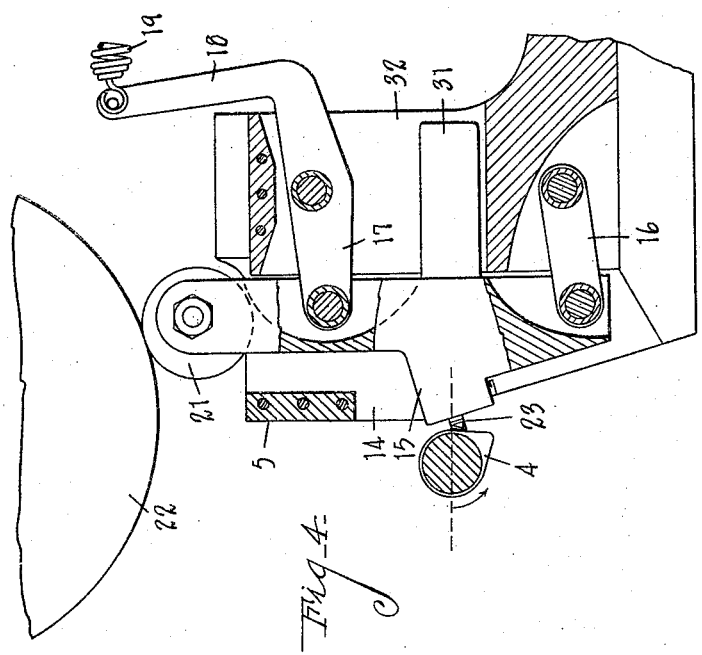
INVENTOR
Herman W. Melling
BY
Chappell Earl
ATTORNEYS Patented Apr. 18, 1933

1,904,949

UNITED STATES PATENT OFFICE

HERMAN W. MELLING, OF JACKSON, MICHIGAN

LATHE

Application filed September 13, 1930. Serial No. 481,685.

My present improvements relate to lathes of the class illustrated in Letters Patent No. 1,634,550 issued to me July 5, 1927.

The main objects of this invention are:

First, to provide an improved lathe for turning non-circular forms such as cams, which is of very large capacity.

Second, to provide an improved pattern reproducing lathe in which non-circular forms such as cams may be very rapidly and accurately produced with a comparatively small allowance for tolerance.

Third, to provide a machine having these advantages which does not become clogged or inoperative in use, the chips being discharged so that they do not enter bearing parts.

Objects pertaining to details and economies of my invention will definitely appear from the description to follow. The invention is defined in the claims.

A structure which embodies the features of my invention is clearly illustrated in the accompanying drawings, in which:

Fig. 2 is an enlarged fragmentary view partially in transverse section on line 2—2 of Fig. 3.

Fig. 3 is a fragmentary section on line 3—3 of Fig. 2.

Fig. 4 is a fragmentary section corresponding to that of Fig. 2 showing the parts in another position.

Fig. 5 is a fragmentary detail view showing still another relation of the tool to the work.

Fig. 6 is a fragmentary vertical section illustrating a modified form or embodiment of my invention.

Figure 1:
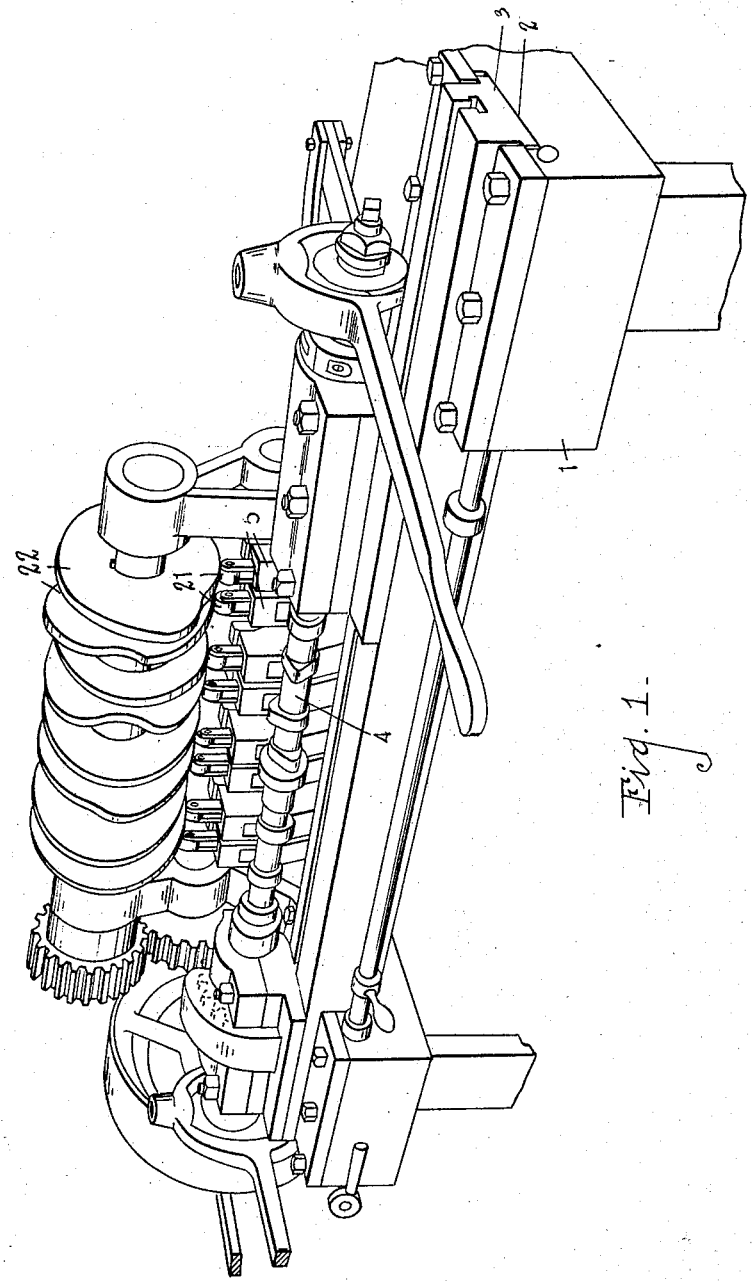
Fig. 1 is a fragmentary front perspective view of my improved lathe.

Referring to the drawings, the bed 1 of the machine is provided with a way 2 for the work carriage 3 which is mounted on the way for longitudinal and lateral movement and carries the chucks for the work 4. No means are provided for controlling or adjusting the carriage as such means form no part of my present invention, and as an efficient means is illustrated and described in Letters Patent No. 1,512,599 issued to me October 28, 1924, I do not illustrate or describe the mechanism in detail herein.

The bed of the machine is also provided with ways for a plurality of tool carriages 5, a carriage being provided for each cam or shape to be cut. The work 4 in the embodiment illustrated is a cam shaft provided with eight cams and therefore there are eight carriage units. The several carriages are mounted for independent reciprocating movement transverse to the axis of the work and, as the carriages or tool holders mounted thereon are duplicates, a description of one will suffice.

The carriage 5 is urged toward the work by means of the spring 6 which is supported at its rear end by the adjusting or tensioning screw 7. These tensioning screws are mounted on the upwardly projecting flange 8 at the rear of the carriage ways. The abutment roller 9 is carried by a support 10 slidably mounted on the carriage and adjusted thereon by means of the screw 11. The spring pressed detent 12 holds this screw in its adjusted positions.

The abutment coacts with the master or carriage control cam 13 arranged between the abutment roller and the work, the axis of this cam 13 being in the plane of the axis of the abutment roller and the work.

In practice, where the work is a cam shaft, a master cam shaft, which is a replica of the work, is mounted in the driving means so that the several carriages are actuated in properly timed relation.

The tool carriage is provided with a vertical recess 14 for the tool holder 15. The side walls of this recess are preferably in supporting engagement with the sides of the tool holder, that is, while the tool holder is free to reciprocate or oscillate in this recess, it is supported laterally by the side walls of the recess.

The tool holder is supported by the parallel links 16 and 17 pivotally mounted on the tool carriage and pivotally connected to the tool holder. The upper link 17 is provided with a rearwardly and upwardly projecting arm 18 to which the spring 19 is connected, the rear end of the spring being engaged with the upwardly projecting arm 20 on the tool carriage. This spring acts to urge the tool holder upwardly, pressing its roller 21 against the tool holder actuating cam 22 which is arranged above the tool holder and in a plane above the work.

The tool 23 is mounted on the tool holder to face downwardly and the work is rotated so that the cut is downward and the chips are discharged downwardly. By this arrangement of parts the chips and debris are discharged downwardly away from bearing and working parts and, further, the tool holder actuating cam engages directly with the tool holder or the roller 21 thereon so that there is no lost motion in operating connections.

The cams 22 may be made of very large size thus avoiding cams with abrupt lifts, and by this arrangement the tool or actuating cam may be readily platted so that the reciprocating movement of the carriage is not reflected in the work, that is, the variation in the vertical plane of the tool holder relative to the tool holder actuating cam is easily compensated.

My improved lathe is of very large capacity and capable of reproducing the master cams or pattern cams with great accuracy.

In the modification shown in Fig. 6 the tool holder 24 is oscillatingly mounted on the pivot 25, a push rod 26 being pivotally connected to the tool holder at 27 and to the link 28 which corresponds to the link 17 in the embodiment previously described. This push rod 26 is provided with a roller 29 which coacts with the tool holder actuating cam. The tool 30 is mounted on the holder 24 to face downwardly.

In the preferred embodiment the tool holder is provided with a rearwardly projecting finger 31 which engages in the slot 32 in the tool carriage to assist in supporting and guiding the tool holder. In the embodiment shown in Fig. 6 the push rod 26 is provided with a corresponding finger 33 which engages the slot in the tool carriage.

I have illustrated and described my improvements in a very practical embodiment. I have not attempted to illustrate or describe certain other embodiments or adaptations as it is believed that these disclosures will enable those skilled in the art to embody or adapt my improvements as may be desired.

Having thus described my invention what I claim as new and desire to secure by Letters Patent is:

1. In a structure of the class described, the combination of a rotary work holder, a tool carriage reciprocating transversely of the work holder, a spring acting to urge said carriage toward the work, a tool carriage control cam which is a replica of the shape of the work to be cut, a tool holder, a pair of parallel supporting links for said tool holder mounted on said carriage, one of said supporting links being provided with a rearwardly projecting arm, a spring connected to said arm and acting to urge said tool holder upwardly, a tool mounted on said tool holder to face downwardly, a tool holder actuating cam mounted above said tool holder and in a plane above the plane of the work, and a roller on said tool holder coacting with said cam.

2. In a structure of the class described, the combination of a rotary work holder, a tool carriage reciprocating transversely of the work holder, a spring acting to urge said carriage toward the work, a tool carriage control cam which is a replica of the shape of the work to be cut, a tool holder, a pair of parallel supporting links for said tool holder mounted on said carriage, a spring acting to urge said tool holder inwardly, a tool mounted on said tool holder to face downwardly, a tool holder actuating cam mounted above said tool holder and in a plane above the plane of the work, and a roller on said tool holder coacting with said cam.

3. In a structure of the class described, the combination of a rotary work holder, a tool carriage reciprocating transversely of the work holder, a tool carriage control cam, a tool, a tool holder, a pair of parallel supporting links for said tool holder mounted on said carriage, one of said supporting links being provided with a rearwardly projecting arm, a spring connected to said arm and acting to urge said tool holder upwardly, a tool holder actuating cam mounted above said tool holder and in a plane above the plane of the work, and a roller on said tool holder coacting with said cam.

4. In a structure of the class described, the combination of a rotary work holder, a tool carriage reciprocating transversely of the work holder, a tool carriage control cam, a tool, a tool holder, a pair of parallel supporting links for said tool holder mounted on said carriage, a spring acting to urge said tool holder upwardly, a tool holder actuating cam mounted above said tool holder and in a plane above the plane of the work, and a roller on said tool holder coacting with said cam.

5. In a structure of the class described, the combination of a rotary work holder, a tool carriage reciprocating transversely of the work holder, a spring acting to urge said tool carriage toward the work, a tool carriage control cam which is a replica of the shape of the work to be cut, a tool, a tool holder, a support for said tool holder comprising a pair of parallel links pivotally mounted on said carriage, one of said links being provided with an arm, a spring connected to said arm and acting to urge the tool holder upwardly, and a cam mounted above and in coacting relation to said tool holder.

6. In a structure of the class described, the combination of a rotary work holder, a tool carriage reciprocating transversely of the work holder, a tool carriage control cam, a tool, a tool holder, a support for said tool holder comprising a pair of parallel links pivotally mounted on said carriage, a spring acting to urge the tool holder upwardly, and a cam mounted above and in coacting relation to said tool holder.

7. In a structure of the class described, the combination of a rotary work holder, a tool carriage reciprocating transversely of said work holder, a tool holder mounted on said tool carriage to reciprocate transversely of the path of the tool carriage, a tool mounted on said tool holder to face downwardly, a tool holder actuating cam mounted above said tool holder to act directly thereon, and a spring acting to urge said tool holder against said actuating cam.

8. In a structure of the class described, the combination of a rotary work holder, a tool carriage reciprocating transversely of said work holder, a tool, a tool holder mounted on said tool carriage to reciprocate transversely of the path of the carriage, and a tool holder actuating cam mounted above said tool holder to coact therewith.

9. In a structure of the class described, the combination of a rotary work holder, a tool carriage reciprocating transversely of the work holder, a tool holder, a support therefor comprising a pair of parallel links pivotally mounted on said carriage, a spring acting to urge said tool holder upwardly, a tool holder actuating cam mounted above said tool holder to coact therewith, and a tool mounted on said tool holder to face downwardly.

It witness whereof I have hereunto set my hand.

HERMAN W. MELLING.